United States Patent [19]

Bourgin

[11] Patent Number: 5,174,496
[45] Date of Patent: Dec. 29, 1992

[54] SUBMERGED AND FUSIBLE DEVICE WITH SAFETY VALVES THAT REPLACE THE FAULTY THERMOSTAT UNIT IN AN ENGINE OR ANALOGUE

[76] Inventor: Alain Bourgin, 39 Passage Claude-Monet, 42100 Saint Etienne, France

[21] Appl. No.: 720,795
[22] PCT Filed: Sep. 7, 1990
[86] PCT No.: PCT/FR90/00596
  § 371 Date: Jul. 3, 1991
  § 102(e) Date: Jul. 3, 1991
[87] PCT Pub. No.: WO91/03633
  PCT Pub. Date: Mar. 21, 1991

[30] Foreign Application Priority Data
  Sep. 7, 1989 [FR] France ............... 89 11940

[51] Int. Cl.$^5$ .................................. F01P 7/16
[52] U.S. Cl. ..................... 236/34.5; 236/DIG. 2
[58] Field of Search .................. 236/DIG. 2, 34.5

[56] References Cited

U.S. PATENT DOCUMENTS

| | | | |
|---|---|---|---|
| 3,189,276 | 6/1965 | Bailey | 236/DIG. 2 |
| 3,300,134 | 1/1967 | Wahler | 236/DIG. 2 |
| 3,498,537 | 3/1970 | Wong | 236/DIG. 2 |
| 3,558,046 | 1/1971 | Kelly | 236/DIG. 2 |
| 4,245,782 | 1/1981 | Brown | 236/DIG. 2 |
| 4,453,668 | 6/1984 | Abel | 236/DIG. 2 |
| 4,981,260 | 1/1991 | Beiser | 236/DIG. 2 |
| 5,011,074 | 4/1991 | Kline | 236/DIG. 2 |

Primary Examiner—William E. Tapolcai
Attorney, Agent, or Firm—Larson and Taylor

[57] ABSTRACT

A safety device for controlling circulation of a cooling fluid of an engine includes a valve seat, a poppet movable toward and away from the valve seat, and a temperature sensing device including a movable element for controlling the movement of the poppet toward and away from the valve seat. A eutectic solder element connects the poppet to the movable element and melts at a predetermined safety temperature. A first spring engages and urges the movable element and hence the poppet toward an engagement with the valve seat. A second spring engages and urges the poppet away from the valve seat opposite to the first spring. Thus, if the cooling fluid reaches the safety temperature and the solder element melts, the second spring moves the poppet away from the valve seat and allows the cooling fluid through the valve seat. Preferably, the movable element includes an enlarged portion, the valve seat includes a retention member extending therefrom, the first spring is compressed between the retention member and the enlarged portion, and the solder element directly connects the poppet to the enlarged portion. The poppet also preferably includes a central opening in which the enlarged portion and the first spring are partially received and movable through when the solder material melts. Further, the valve seat also includes a second retention member, and the second spring passes about the movable element and is compressed between the enlarged portion and the second retention member.

3 Claims, 1 Drawing Sheet

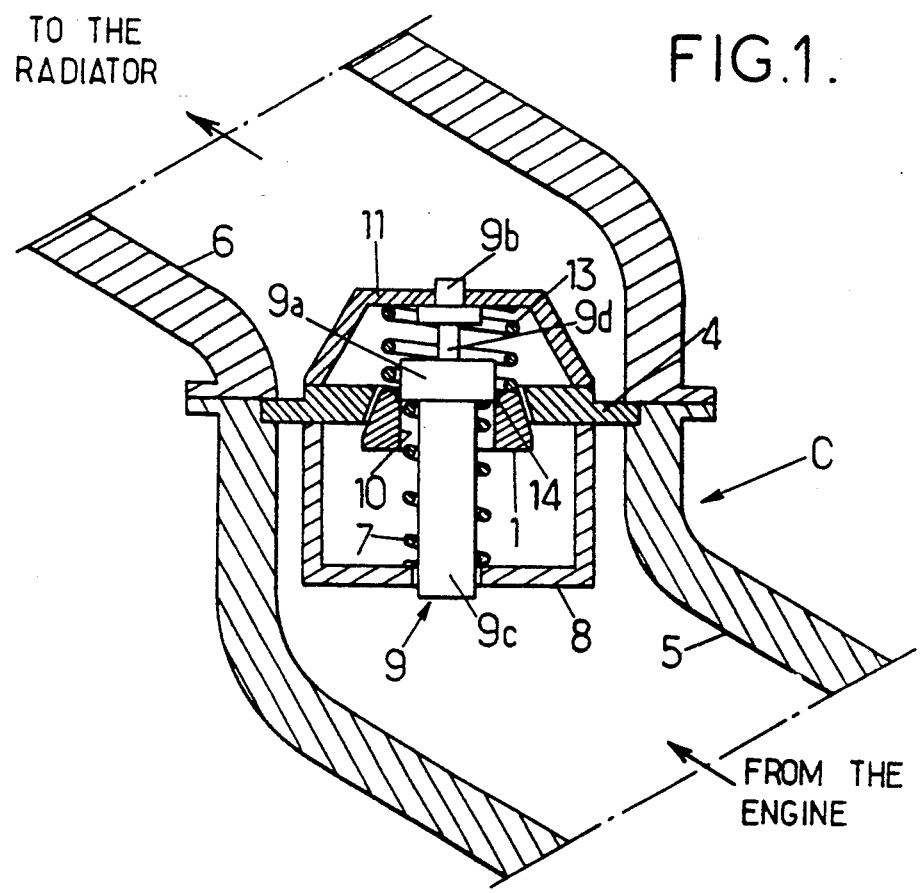
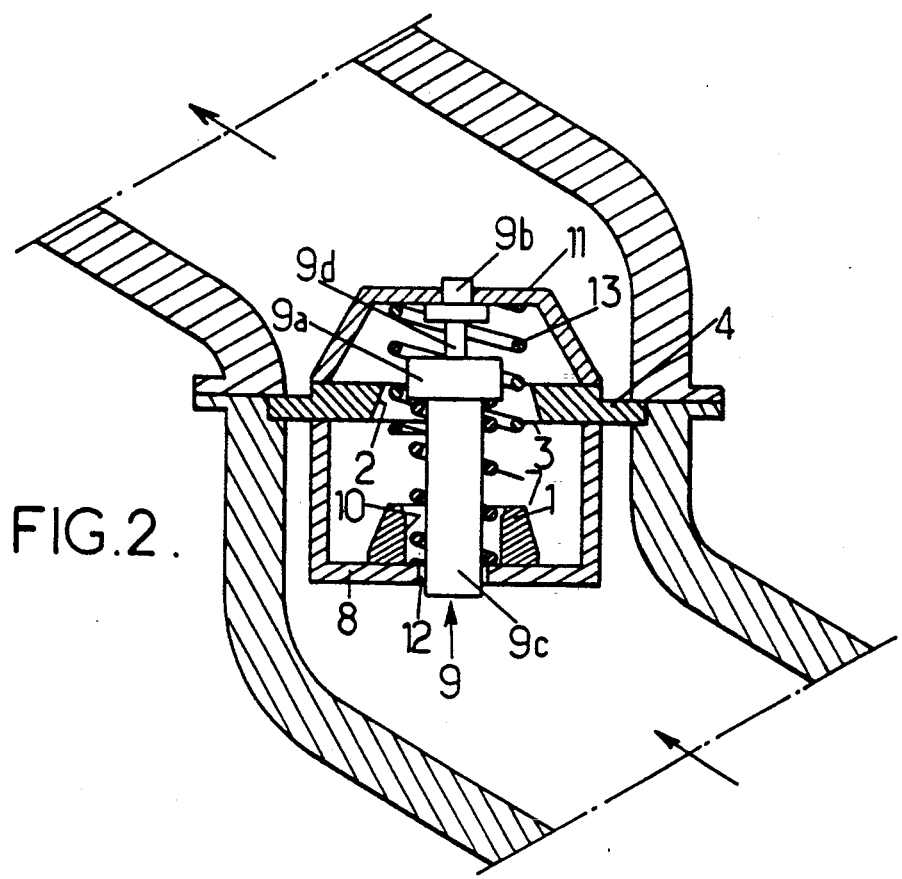

SUBMERGED AND FUSIBLE DEVICE WITH SAFETY VALVES THAT REPLACE THE FAULTY THERMOSTAT UNIT IN AN ENGINE OR ANALOGUE

The present invention relates to a safety device having a poppet and an immersed temperature-sensing element, this device being more particularly intended for the cooling system of an internal combustion engine.

This device controls the circulation of the cooling fluid in a pipe connecting the engine and a radiator, and comprises for this purpose a poppet associated with a temperature-sensing element immersed in the said fluid, suitable for controlling the increase in the opening of the poppet when the temperature of the cooling fluid increases and for allowing the reduction in this opening of the poppet when the temperature of the cooling fluid decreases, the said poppet being urged against its valve seat by a first spring which acts in opposition to the movable portion of the said temperature-sensing element when the latter actuates the said increase in the opening of the poppet, a device in which the said poppet is solidly attached to the said temperature-sensing element by at least one solder element provided in order to melt at a so-called "safety" temperature at which the circulation of the cooling fluid between the engine and the radiator has to be allowed at full opening.

A device of this type is known, for example by the U.S. Pat. No. KELLY 3,558,046, which comprises a temperature-sensing element 24 suitable for controlling the opening of a poppet 22 returned back to its closed position by a spring 35 acting on a brace 37. A fusible metal rivet 41 connects the top of this brace to the poppet 22 and to the upper end 26 of the temperature-sensing element. When the temperature of the cooling fluid increases, the upper portion 26 of the temperature-sensing element moves upwards forcing with it the poppet 22, which increases the flow rate of the cooling fluid. When the temperature of the cooling fluid reaches the critical value, the metal rivet 41 melts and the poppet 22 is no longer held in place by the brace 37; this poppet escapes into the circulation system of the cooling system.

This device has three essential drawbacks.

One reason for this is that, the more the temperature of the cooling fluid increases the more the spring 35 is compressed and the more the top of the brace 37 subjects the fusible metal rivet 41 to high mechanical stresses, which runs the risk of destroying the latter before the temperature of the cooling fluid reaches the critical value.

The second drawback resides in the fact that the metal rivet 41 passes from the solid state to the molten state by passing through a pasty intermediate state, which increases the above-mentioned risk of destruction of the fusible metal rivet 41 well before it reaches the critical temperature.

The third drawback resides in the fact that after rupture of the metal rivet, the poppet, escaping into the cooling system, runs the risk of creating a blockage of the downstream cooling pipe or of creating other problems therein.

The object of the present invention is to eliminate all these drawbacks.

For this purpose, a safety device having a poppet, of the general type defined hereinablve is, in accordance with the present invention, essentially characterised in that it comprises a second spring acting on the said poppet in its opening direction, by opposing the said first spring, in that this first spring can only act on the said poppet by the agency of the said temperature-sensing element, namely only when the said solder element ensures the solid attachment between the temperature-sensing element and the poppet, and in that the said solder element is formed from a eutectic material, namely a material passing directly from the solid state to the liquid state when it is subjected to a specified temperature without passing through the pasty intermediate state.

By virtue of this general arrangement, the second spring relaxes when the temperature of the cooling fluid increases, since this increase in the temperature tends to open the poppet. As a result the fusible solder element undergoes, at the level of its connection with the temperature-sensing element, shear forces of progressively decreasing magnitude as the temperature increases, which prevents its being destroyed before reaching its melting point. This effect is reinforced by the fact that a fusible solder element made from a eutectic material is chosen which passes directly from the solid state to the liquid state. The triggering of the safety device, manifesting itself in full and permanent opening of the poppet, will therefore occur at a very precise temperature of the cooling fluid.

One embodiment of the invention will now be described by way of non-limiting example, with reference to FIGS. 1 and 2 of the attached drawing in which:

FIG. 1 is a view, in axial cross-section, of a device in accordance with the invention, during normal operation, the poppet being slightly open; and FIG. 2 is a similar view of the device after triggering of the safety device.

The device shown in FIGS. 1 and 2 comprises a poppet 1 suitable for being applied against a valve seat 2 in order to open or block off a passage 3 provided in a wall 4; when the poppet 1 is closed, this wall 4 separates, in a leak-tight manner, the sections 5 and 6 of a pipe C connecting the engine of a vehicle to its radiator (which are not shown). This device comprises a first helical spring 7 compressed between a first retention member 8 and an enlarged portion 9a of a temperature-sensing element 9. The upper end of this spring traverses an opening 10 of the poppet, such that this spring cannot act directly on the latter. The element 9 is fixed by its head 9b to a second retention member 11 and its body 9c, which is integral with the enlarged portion 9a, can slide in an axial passage 12 of the first retention member 8.

A second helical spring 13 is compressed between the poppet 1 and the second retention member 11 by passing around the enlarged portion 9a of the temperature-sensing element 9.

Finally, the enlarged portion 9a is solidly attached to the poppet 1 by a solder element made of eutectic material. The melting point of this solder element is chosen to have a temperature corresponding to that for which the circulation of the cooling fluid in the pipe C has to be allowed at full opening, and this is so as to prevent the engine overheating.

Given the above, the operation of this device is as follows:

When the cooling fluid is cold, the spring 7 urges the poppet 1 against the seat 2, thereby blocking off the passage 3. As the water of the engine is not going to the radiator, the temperature of the cooling fluid increases.

The temperature-sensing element 9 extends, the portion 9a–9c sliding downwards on the rod 9d which connects the head 9b to the enlarged portion 9a, in a manner known per se. The head 9a therefore forces the poppet 1 downwards thereby compressing the spring 7, which allows the flow of the cooling fluid through the passage 3, as is shown in FIG. 1. If the temperature of the cooling fluid decreases, the spring 7 brings the poppet 1 back into the closed position.

It should be noted that, the higher the temperature, the lower is the position of the poppet 1, as a result of which the eutectic solder element 14 is subjected to a smaller and smaller shear stress, since the spring 13 relaxes progressively and soon no longer exerts any pressure on the poppet 1. Thus, the eutectic solder element 14 does not run the risk of giving way before reaching its melting point, as is the case with non-eutectic solder elements of the prior art.

If the temperature of the cooling fluid exceeds a predetermined value, this solder element 14 melts, which detaches the poppet 1 from the enlarged portion 9a of the temperature-sensing element. In that case, the poppet 2 falls permanently onto the retention member 8 (FIG. 2), which keeps the passage 3 fully open and thus provides the safety device against overheating, by increasing the circulation of the cooling fluid between the engine and the radiator.

Because the solder element 14 is eutectic, it melts abruptly as soon as the temperature of the cooling fluid reaches the critical level, without passing through an intermediate pasty state, as is the case with the fusible materials normally used, which are not eutectic.

Thus, the fact that the solder element 14 is eutectic, combined with the fact that the shear forces which are exerted on this solder element by the spring 13 decrease when the temperature increases, ensures that it has a long life as long as the temperature of the cooling fluid does not reach its melting point.

I claim:

1. A safety device for controlling circulation of a cooling fluid in a cooling system of an internal combustion engine, said safety device being located in a pipe connecting the engine and a radiator and comprising:
   a valve seat including an opening therein and a retention member extending therefrom;
   a poppet which is movable toward and away from said valve seat and hence into and out of said opening to increase and decrease resistance to flow of the cooling fluid through said opening;
   a temperature sensing means which is immersed in the cooling fluid for controlling the movement of said poppet such that as a temperature of the cooling fluid increases said poppet is moved away from said valve seat and as the temperature of the cooling fluid decreases said poppet is moved toward said valve seat, said temperature sensing means including a movable element having an enlarged portion;
   a solder element which directly connects said enlarged portion of said poppet to said movable element of said temperature sensing means to prevent relative movement therebetween, said solder element being formed of an eutectic material which melts directly from a solid state to a liquid state at a predetermined safety temperature such that said poppet moves with said movable element so long as the safety temperature is not exceeded;
   a first spring which is compressed between said enlarged portion of said movable element and said retention member of said valve seat and thereby urges said movable element and hence said poppet connected thereto by said solder element toward a position for engagement of said poppet with said valve seat; and
   a second spring which engages said poppet and urges said poppet away from said valve seat in a direction opposite to the urging of said first spring such that if the cooling fluid reaches the safety temperature and said solder element melts there no longer is an attachment between said poppet and said movable element and said second spring moves said poppet away from said valve seat and decreases resistance to flow of the cooling fluid through said opening.

2. A safety device as claimed in claim 1 wherein said poppet includes a central opening in which said enlarged portion and said first spring are partially received and through which said first spring is relatively movable when said solder material melts.

3. A safety device as claimed in claim 1 wherein said valve seat also includes a second retention member, and wherein said second spring passes about said movable element and is compressed between said poppet and said second retention member.

* * * * *